Figure 1:
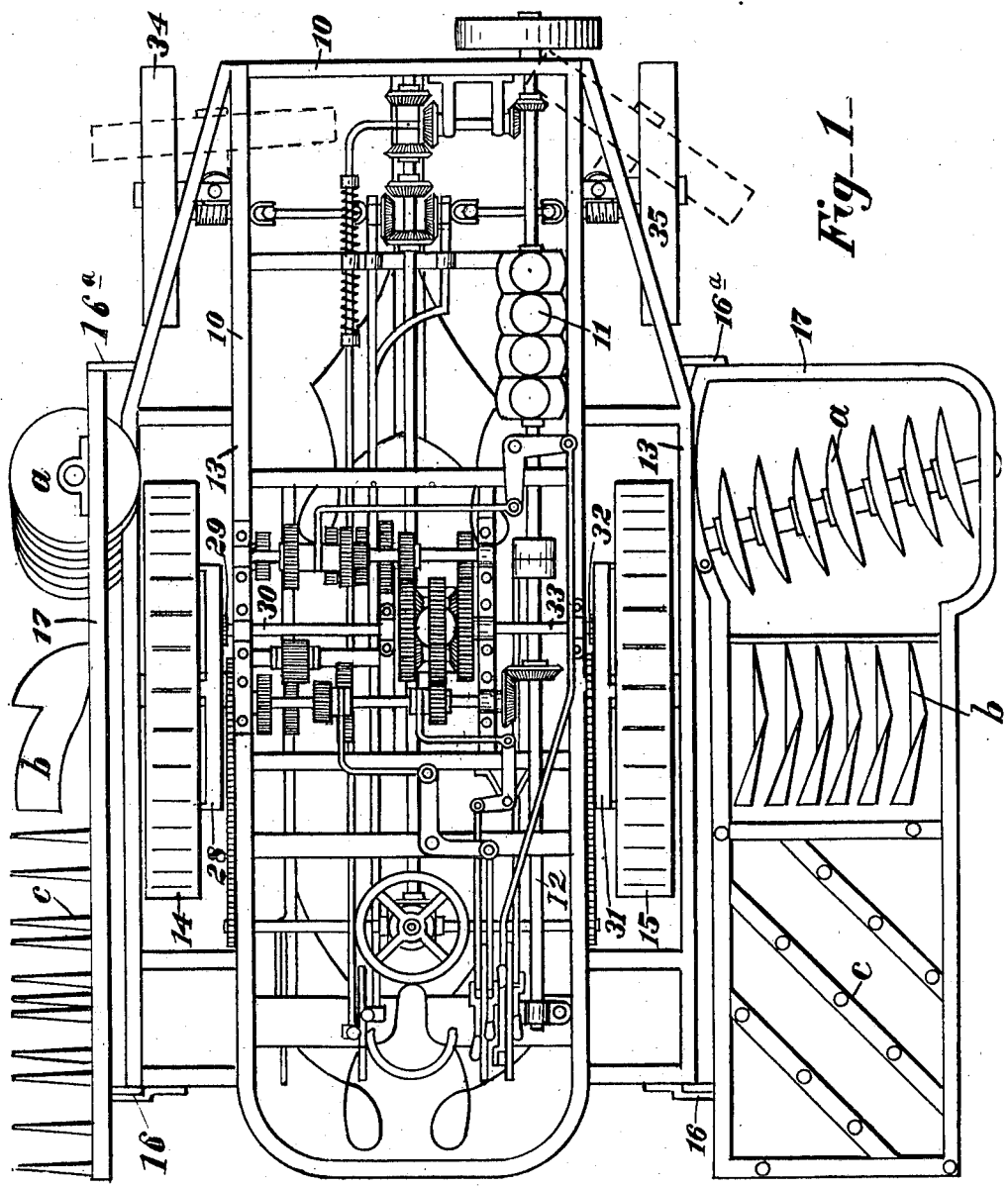

T. M. EDWARDS.
TRACTION AGRICULTURAL IMPLEMENT.
APPLICATION FILED JAN. 7, 1911.

1,053,485.

Patented Feb. 18, 1913.

2 SHEETS—SHEET 1.

WITNESSES:
Frank C. Palmer
Madeline D. Ritchie

Thomas M. Edwards, INVENTOR,
BY Frank N. Allen
ATTORNEY.

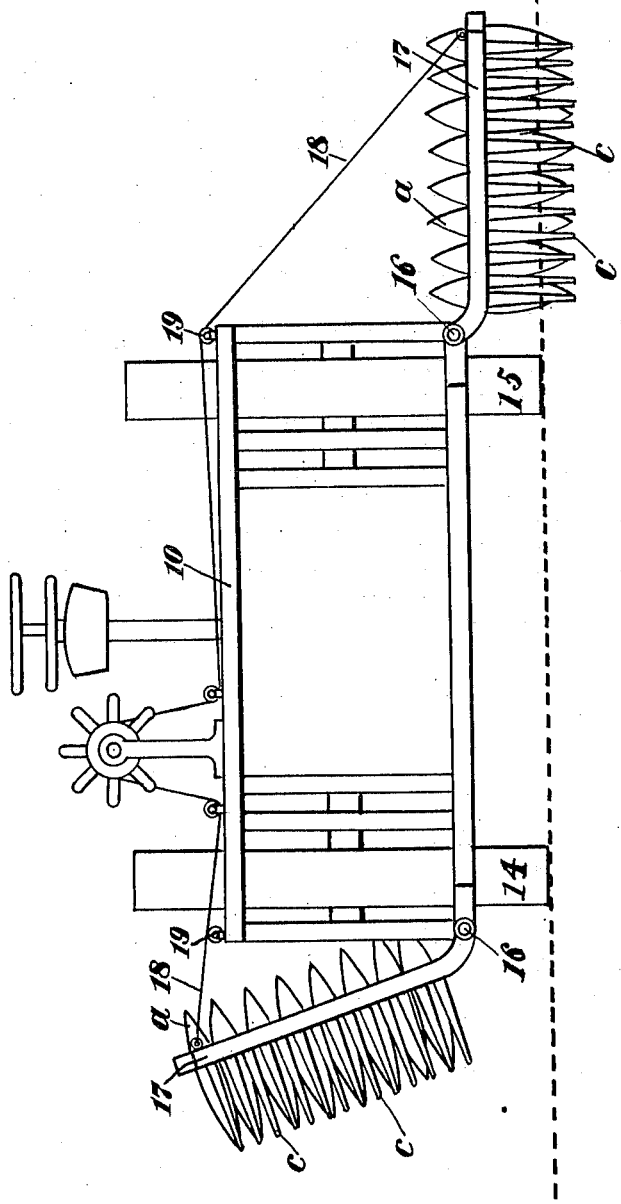

UNITED STATES PATENT OFFICE.

THOMAS M. EDWARDS, OF EAST HAMPTON, NEW YORK.

TRACTION AGRICULTURAL IMPLEMENT.

1,053,485. Specification of Letters Patent. Patented Feb. 18, 1913.

Application filed January 7, 1911. Serial No. 601,416.

*To all whom it may concern:*

Be it known that I, THOMAS M. EDWARDS, a citizen of the United States, and a resident of East Hampton, in the county of Suffolk and State of New York, have invented certain new and useful Improvements in Traction Agricultural Implements, of which the following is a specification.

This invention relates to traction engines of the general type used with steam plows, cultivators and the like agricultural implements, and my said invention also includes certain novel combinations, and relative arrangements, of such implements with said engine, whereby a ready and easy control of such implements may be assured.

In order to explain my said invention clearly, I have provided the annexed drawings, in which—

Figure 1 is a top or plan view of my newly improved machine, with the housing removed to disclose the interior parts. Fig. 2 is a rear end view of the frame and traction wheels, showing one set of harrows lowered to their operative positions.

Referring to these drawings, the numeral 10 indicates the main frame-work of my device, the same being of general rectangular form and having mounted thereon, at a point near the front portion of said frame, an engine which is indicated by the numeral 11. In alinement with said engine is a shaft 12 which serves as the main driving shaft or prime mover of the various operative elements of my device. Secured to the main frame 10, at opposite sides thereof, are extension frames 13 that are spaced apart from the main frame a distance sufficient to receive the traction wheels 14 and 15, as is best seen in Fig. 1 of the drawings, said traction wheels being driven independently, as I have explained more particularly hereinafter. Hinged to each extension frame 13, at 16 and 16ª, is a frame 17 in which is supported a train of harrows; by preference a disk harrow *a* at the front, a toothed harrow *c* at the rear, and an "Acme" harrow *b* at, or near, the mid-portion of each frame 17, this arrangement being such that the ground is cut up to some extent, by the disk harrows, and is then pulverized and leveled by the successive actions of the "Acme" and toothed harrows.

By reason of the hinged connection between frame 17 and the main frame 10 the operator is able to drop the harrows to their operative positions or raise them to their inoperative positions. In the Fig. 1 the right hand harrows are shown in their lower, or operative position while those at the left hand side of the machine are shown in their elevated, or inoperative position.

The frames 17 are lowered by gravity and are raised by means of chains or cables 18 that lead over pulleys 19 and are connected with levers that are within easy reach of the operator of the machine.

The traction wheels 14 and 15 are journaled and driven independently of each other. Wheel 14 has secured to its inner face an internal gear 28 that is engaged, and driven by, a relatively small gear 29 on a shaft 30, and wheel 15 has secured to its inner face a like internal gear 31 that is driven by a spur gear 32 on a shaft 33; the shafts 30 and 33 being in longitudinal alinement with each other and controlled by a system of independently reversible gearing whereby said shafts may be driven in opposite directions, or either of said wheels may be stopped while the companion wheel is continued in revolution. I am thus able to turn the complete machine in its own length if necessary, and to readily shunt the complete machine to one side a distance equal to the width of one or more furrows, according to the number of plows employed. The front end portion of the machine is supported and steered, or guided, by means of wheels 34—35 that are also independently mounted and operated, as will be understood by reference to Fig. 1 of the drawings. These guide wheels are so mounted that they may be adjusted so as to travel in an arc of a circle of which the turning point of the machine is the center or they may be adjusted so as to aline with the drivers 14 and 15 whenever it is desired to drive the machine in a right line, as during the operation of plowing. By means of the described duplex system of independently operated wheels I am able to guide my described machine with extraordinary ease and certainty.

By means of my described improvements I am able to produce a machine of great power and utility that may be readily controlled and operated by a single person.

Having thus described my invention I claim as new and wish to secure by Letters Patent:—

In a machine of the class described, a main frame, independently journaled traction wheels therein, means for independently driving said wheels, rigid rectangular extension frames secured to the main frame at opposite sides thereof and spaced apart therefrom to receive said traction wheels, a frame at each side of the main frame and hinged at its lower edge to the bottom of the extension frame below the axles of said wheels, and means for raising and lowering said hinged frame, said frames adapted to carry agricultural implements and when lowered being disposed below the main frame.

THOMAS M. EDWARDS.

Witnesses:
 FRANK H. ALLEN,
 CHARLES T. TOPLIFF

Copies of this patent may be obtained for five cents each, by addressing the "Commissioner of Patents Washington, D. C."